Figure 9:
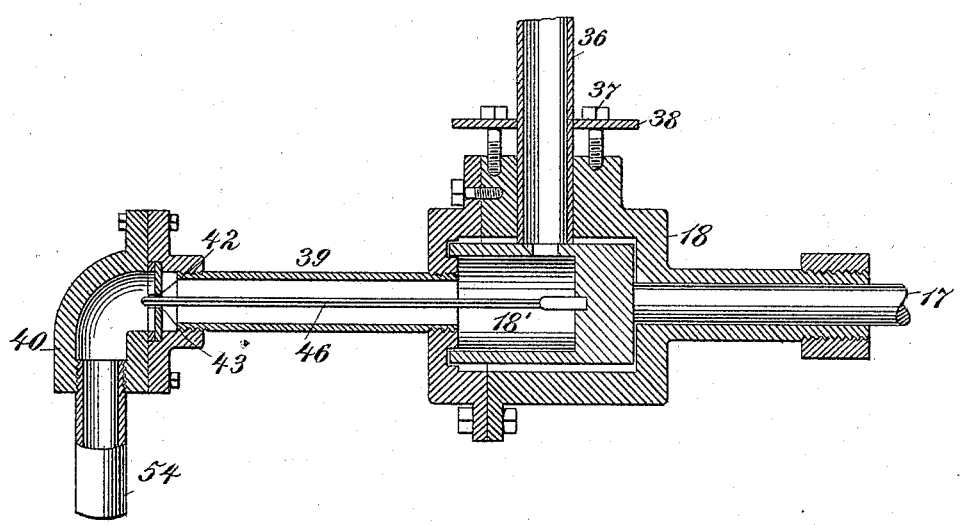

(No Model.) 3 Sheets—Sheet 1.
E. W. HOWELL.
AUTOMATIC VALVE ACTUATING DEVICE FOR REFRIGERATING APPARATUS.
No. 537,772. Patented Apr. 16, 1895.
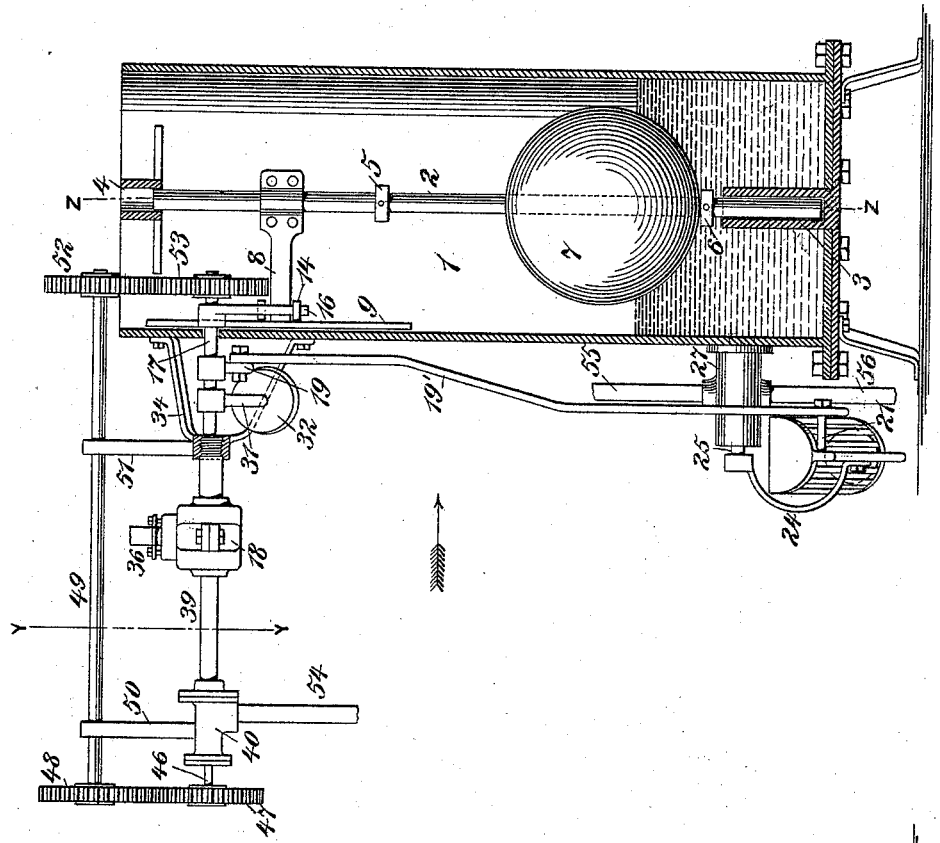
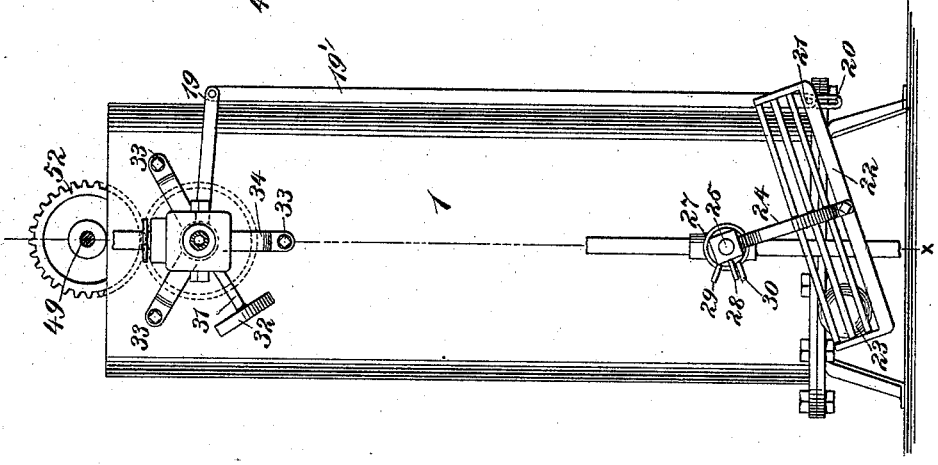
WITNESSES:
William Gaebel.
C. L. Davis
INVENTOR
Edward W. Howell
BY
E. W. Marble
ATTORNEY.

(No Model.) 3 Sheets—Sheet 2.
E. W. HOWELL.
AUTOMATIC VALVE ACTUATING DEVICE FOR REFRIGERATING APPARATUS.
No. 537,772. Patented Apr. 16, 1895.
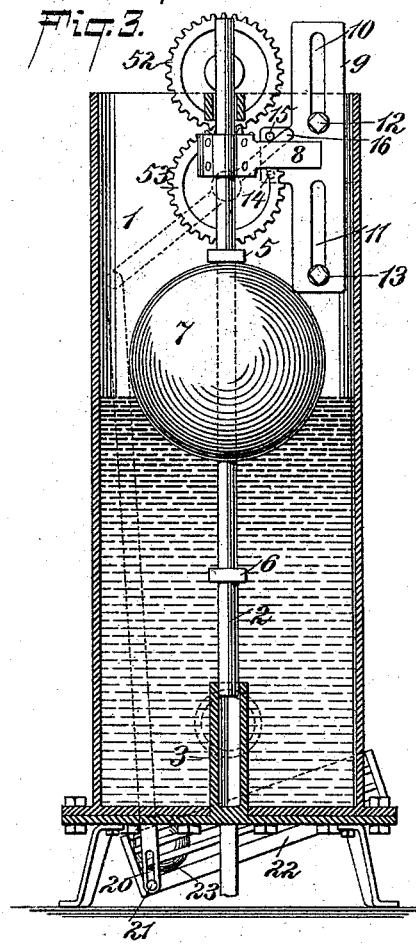
WITNESSES:
William Goebel.
C. L. Davis
INVENTOR
Edward W. Howell
BY
E. M. Marble
ATTORNEY.

(No Model.) 3 Sheets—Sheet 3.

E. W. HOWELL.
AUTOMATIC VALVE ACTUATING DEVICE FOR REFRIGERATING APPARATUS.

No. 537,772. Patented Apr. 16, 1895.

WITNESSES:
William Goebel.
C. L. Davis

INVENTOR
Edward W. Howell
BY
E. W. Marble
ATTORNEY.

UNITED STATES PATENT OFFICE.

EDWARD W. HOWELL, OF NEW YORK, N. Y., ASSIGNOR OF ONE-HALF TO DAVID M. DEMAREST AND ALBERT N. ROMAINE, OF SAME PLACE.

AUTOMATIC VALVE-ACTUATING DEVICE FOR REFRIGERATING APPARATUS.

SPECIFICATION forming part of Letters Patent No. 537,772, dated April 16, 1895.

Application filed January 20, 1892. Renewed February 20, 1895. Serial No. 539,131. (No model.)

*To all whom it may concern:*

Be it known that I, EDWARD W. HOWELL, a citizen of the United States, residing in the city and county of New York, in the State of New York, have invented certain new and useful Improvements in Automatic Valve-Actuating Devices for Refrigerating Apparatus, of which the following is a specification, such as will enable those skilled in the art to which it appertains to make and use the same.

My invention relates, generally, to refrigerating apparatus, and particularly to automatic refrigerating apparatus of the class which employs liquid anhydrous ammonia or other similar expansible substance as a refrigerant; and my invention consists in the novel mechanism by which the supply of refrigerant to the cooling coils or chambers is automatically regulated, in the means by which this supply is adjusted to the requirements, so that any desired degree of cold may be produced and maintained, and in the means by which clogging of the expansion passage is prevented.

The objects of my invention are, first, to provide a mechanism for operating the valves of refrigerating apparatus which shall be capable of automatically controlling said valves so that any desired and predetermined quantity of the refrigerant may be admitted to the cooling pipes or chambers; second, to make the adjustment of the apparatus easy and simple; third, to provide efficient and automatic means for clearing out and preventing clogging in the expansion passage of the refrigerating apparatus, and, fourth, to make the apparatus simple, strong, inexpensive, both in construction and maintenance, not liable to derangement, and efficient and certain in action. These objects are attained in the apparatus herein described and illustrated in the drawings which accompany and form a part of this application, in which the same reference numerals indicate the same or corresponding parts, and in which—

Figure 1 is a front view of the apparatus, which is shown as sectioned on the line $y$—$y$ of Fig. 2, the view being taken looking in the direction of the arrow shown in connection with Fig. 2. Fig. 2 is a side elevation of the apparatus, the water reservoir being shown as sectioned on the line $x$—$x$ of Fig. 1. Fig. 3 is a vertical section of the apparatus taken on the line $z$—$z$ of Fig. 2, the view being taken from the opposite side from which Fig. 1 is taken. Figs. 4, 5, and 6 are detail views of the three-way cock employed to admit water to the reservoir. Fig. 7 is a vertical section of the ammonia valve. Fig. 8 is a detail view illustrating the form and manner of operation of the reaming rod used for clearing the expansion passage. Fig. 9 is a vertical section of an ammonia valve which is a slight modification of the valve shown in Fig. 7.

Referring to the drawings, the numeral 1, designates a reservoir of any suitable material and shape, preferably of iron, and of substantially tubular form as shown. Within this reservoir 1, is a rod 2, sliding freely up and down in bearings 3, and 4, suitably arranged within such reservoir. Rigidly, but adjustably secured to the rod 2, at appropriate points thereon, are collars or stops 5 and 6, and mounted on said rod 2, between said stops 5 and 6, so as to slide freely up and down thereon, is a float or ball 7, of such specific gravity as to float easily upon water admitted to the reservoir, and to lift with it the rod 2, and mechanism attached to such rod, when the water therein reaches a sufficient height to bring said float 7, into contact with the upper stop 5, thereon. Rigidly secured to said rod 2, preferably near the upper end thereof, and extending at right angles thereto, is a bar 8, to the other end of which is rigidly secured a plate 9, preferably of substantially the form shown, and having slots 10 and 11, through which pass bolts 12, and 13, by which said plate is held against the interior of the casing 1, and its upward and downward movement limited. Extending inward toward the center of the casing 1, from the plate 9, and rigidly secured thereto, are pins 14 and 15, adapted to receive between them with some little play, one end of a lever 16, the other end of which is rigidly secured to a shaft 17, which passes through the side of the casing 1, as shown, and forms the valve stem of the valve 18', which regulates the flow of the liquid anhydrous ammonia, as hereinafter more particularly described. Rigidly secured to said shaft 17, without the reservoir 1, is a lever 19, pivotally attached at its outer end to a connecting rod 19', the lower end of which is provided with a slot 20, through which passes a bolt or pin 21, adapted to slide freely up and down therein, by which such connecting rod, is connected with one end of a crated-lever 22, adapted to receive a rolling-ball weight 23, as shown. This crated lever 22, has rigidly secured thereto, near the center thereof, a lever 24, the upper end of which turns upon a short shaft, or stem 25, attached to the three-way valve 26, within the valve casing 27.

Projecting from the upper end of the lever 24, preferably toward the side, is a bent pin 28 Fig. 4, preferably of the shape shown, adapted to engage with bent pins 29, and 30, rigidly inserted in the end of the valve 26, so as to actuate said valve when the lever 24, is moved sufficiently far in either direction.

If desired, the pins 28, 29 and 30, may be dispensed with and the lever 24, may be rigidly secured to the shaft or stem 25, of the valve 26, as shown in Fig. 5 so as to turn the valve at every movement of the lever 24, but I prefer to use the devices shown, for the reason that with them the valve is actuated entirely by the ball-weight, and not at all by the movement of the connecting rod 19'.

In order that the moving parts of the device may not return by their own weight to their former position when the water begins to run out of the reservoir 1, and to balance the same, so that their manipulation will be easier, a lever 31, provided with a weight 32, is rigidly secured to the shaft 17, so as to project therefrom in a direction opposite to the lever 19.

Rigidly secured to the exterior of the reservoir 1, by means of bolts 33, is a tripod 34, into the center of which is screwed the stem of the valve-casing 18, which forms a journal-box or bearing for the outer end of the shaft 17, which is connected to and forms the operating stem of the valve 18', inclosed in such casing 18. The valve 18', is the one through which the liquid anhydrous ammonia is admitted to the point where it is expanded into gas, and may be of any desired form, but is preferably of that shown in Figs. 7 and 9, consisting of a hollow cylinder closed at the end to which is attached the shaft 17, and open at the other, and provided with a small inlet hole 35, formed in the side of such cylinder, through which the ammonia is admitted to the center thereof, the valve seat being formed by the end of the pipe 36, through which such ammonia is conducted thereto, which is concaved so as to fit the side of said valve, and is kept tightly pressed against the same by screw-bolts 37, passing through a collar 38, rigidly secured to said pipe 36, and screwing into suitably threaded-holes formed in the valve casing 18. The liquid ammonia after being admitted to the interior of the valve 18', passes out through the end of the valve casing, which for convenience in repairing the valve is made removable as shown, into a short pipe 39. This pipe 39, communicates at its farther end with an elbow-joint 40, preferably of the form shown, and consisting of two parts held together by screw-bolts 41, and at the junction of these two parts of said joint 40, is a diaphragm 42, pierced by a small hole 43, formed therein, preferably in the center thereof; and an air-tight joint is preferably formed between the outer edges of the diaphragm and the elbow, by means of a suitable packing 44. Passing through the rear of the elbow 40, and a surrounding gland and packing 45, is a revoluble shaft 46, provided with a reaming-point of any suitable form, preferably triangular as shown in Fig. 8, which passes through the hole 43 in the diaphragm 42, and on the outer end of this shaft 46, is rigidly mounted a gear-wheel 47, meshing with a gear-wheel 48 rigidly mounted on a shaft 49, having journal-bearings in standards 50 and 51, preferably mounted on the elbow 40, and tripod 34; and this shaft 49, has rigidly mounted on its other end a gear-wheel 52, meshing with another gear-wheel 53, which is rigidly mounted on the inner end of the shaft 17, within the reservoir 1.

The pipe 39 forms a chamber for receiving the ammonia to be expanded within the cooling coils, and may be varied in size according to the amount of cooling surface to be supplied with ammonia. The action of the apparatus is intermittent, the valve 18' being opened for a time sufficient to cause the chamber 39 to be filled with anhydrous liquid ammonia, when the valve is closed in the manner to be hereinafter described, and the liquid ammonia passes through the aperture 43 in the diaphragm 42, and expands within the cooling pipes. After a few moments, during which the ammonia within the chamber 39 will have evaporated completely, the valve 18' is again opened and a new supply of liquid ammonia is admitted to the chamber. By this method of intermittent delivery waste of the ammonia through its incomplete expansion within the cooling pipes is prevented, and the amount of ammonia delivered within a given time to the cooling pipes is regulated, the chamber 39 being in effect but a measuring receptacle which is filled with liquid anhydrous ammonia and then emptied into the cooling pipes, the frequency of the movements of the valve and consequently the amount of refrigerant supplied to the cooling pipes within a given time being regulated by shifting the stops 5 and 6 on the rod 2, or by regulating the flow of the water in the inlet and outlet pipes of the reservoir, or both; and inasmuch as a definite quantity of liquid anhydrous ammonia in evaporating and expanding absorbs a definite and constant number of heat units, the temperature of the apartments to be cooled may be regulated and kept at any desired point by regulating the frequency of the movements of the valve 18'.

Communicating with the elbow 40, at the bottom thereof, is a pipe 54, through which the anhydrous ammonia is conducted to the cooling coils, in the apartments to be cooled, and communicating with the three-way cock 26, at opposite sides thereof are pipes 55, and 56, through which the reservoir 1, is filled and emptied, the water, or other suitable fluid used, flowing into said reservoir through said cock 26, by way of the pipe 55, and hole 57, and from the same through said cock, by way of the hole 58, and pipe 56.

The operation of the device is as follows:— The reservoir 1, being empty, the ball-float 7, pressing on the collar 6 attached to the rod 2, will pull down the same, and through the connecting mechanism close the valve 18', and lift up that end of the crated lever 22, attached to the connecting-rod 19', until the ball-weight 23, rolls by gravity to the other end of such crated lever 22, and by its weight causes the same to assume the position shown in Fig. 1, when the three-way cock 26, will be found to be turned to the position shown in detail in Fig. 6. Water being then turned on through the pipe 55, from any convenient source, flows through the hole 57, and cock 26, to the interior of the reservoir 1. As the water rises therein it carries upward the ball-float 7, until the same strikes against the upper collar 5, attached to the rod 2, and lifts said rod into the position shown in Fig. 3, and as the rod 2, passes upward it carries with it the lever 8, to which is secured the slotted plate 9, and consequently the end of the lever 16, is also carried upward by the pin 14, pressing against the under side thereof, and the other end of said lever 16, being attached to the shaft 17, such shaft is consequently partially rotated, sufficiently far to open the valve 18', and thus admit the liquid anhydrous ammonia to the pipe 39. At the same time—by means of the gear-wheels 53, 52, 48 and 47, such rotation of the shaft 17, also causes the triangular pointed shaft 46, to rotate in the hole 43, in the diaphragm 42, and said hole 43, is thereby cleared of any sediment which may have collected therein, and an unimpeded passage is made for the anhydrous ammonia therethrough. The same movement of the shaft 17, also depresses the outer end of the lever 19, and through the connecting-rod 19', the end of the crated lever 22, to which such connecting-rod is attached by means of the pin 21, and slot 20, until the said crated-lever 22, is tilted sufficiently far to allow the rolling ball-weight 23, to roll along the same to the end so connected to the rod 19', when the weight of such ball-weight, will force said crated lever 22, into the position shown in Fig. 3, by which movement the pin 28, coming into contact with the pin 29, attached to the three-way cock 26, will turn the same into the position shown in Fig. 5, when the flow of water from the pipe 55, will be cut off, and the water in the reservoir 1, allowed to escape therefrom through said cock 26, by way of the hole 58, into the pipe 56. The weighted lever 31, attached to the shaft 17, assists in keeping the entire mechanism operating the valve 18', *in statu quo*, until the water in the reservoir 1, having all run off through the cock 26, the float 7, striking against the collar 6, carries down with it the rod 2, whereby the lever 16, is depressed by the pin 15, striking against the under side thereof, whereby the shaft 17, is partially rotated in a reverse direction from that heretofore described, the valve 18', consequently closed, so as to shut off the flow of anhydrous ammonia, and the shaft 46, also reversely rotated so as to again clear the hole 43, in the diaphragm 42, of sediment. At the same time the lever 19, and the connecting rod 19', being lifted, the crated lever 22, is tilted, and the rolling-ball 23, rolls along the same, still further depressing the other end thereof, thus reversely rotating the cock 26, into the position shown in Fig. 6, thereby closing the outlet, and opening the inlet, to the reservoir 1, and this operation may be repeated indefinitely, or as long as water is supplied to the reservoir 1, through the pipe 55.

In the modified form of that portion of the device designed for clearing the hole 43, in the diaphragm 42, of sediment, which is shown in Fig. 9, the triangular pointed reaming-rod 46, is firmly secured to the inner side of the closed bottom of the valve 18', in such manner as to be rotated therewith, and projects therefrom, through the pipe 39, consequently passing through the hole 43, in the diaphragm 42, in a reverse direction from what it does in the form of construction shown in Fig. 7. In this modified form of construction the necessity for the gear-wheels 47, 48, 52, and 53, and for the shaft 49, being obviated, they are of course omitted.

I do not in this application claim the ammonia valve 18' herein shown and described, as this valve forms the subject-matter of an application for Letters Patent of even date herewith.

Although I prefer to use the device herein illustrated for operating the valves of my apparatus, I do not limit myself to the use thereof, but may use any other device adapted to operate valves intermittently at regular intervals. Neither do I intend to limit myself to the particular form of any portion of the apparatus shown, as it is very evident that many modifications in the construction, combination, and arrangement of the various parts of my improved apparatus, other than those particularly mentioned, may be made without departing from the scope of my invention.

I claim—

1. In a refrigerating apparatus, the combination, with a refrigerant supply pipe and suitable cooling pipes or chambers in communication therewith, of an expansion passage interposed between said supply pipe and cooling pipes or chambers, a reaming rod within said expansion passage, and means for rotating said rod, substantially as described.

2. In a refrigerating apparatus, the combination, with a refrigerant supply pipe and suitable cooling pipes or chambers in communication therewith, of an apertured expansion diaphragm interposed between said supply pipe and cooling pipes or chambers, a reaming rod inserted through the perforation in said diaphragm, and means for rotating said rod, substantially as described.

3. In a refrigerating apparatus, the combination, with a refrigerant supply pipe and suitable cooling pipes or chambers, of a refrigerant receiving chamber in communication with said cooling pipes or chambers, a valve in said receiving chamber in communication with the refrigerant supply pipe, and means for automatically actuating said valve at intervals, whereby the refrigerant receiving chamber is alternately filled from the refrigerant supply pipe and emptied by evaporation and expansion within the cooling pipes, substantially as described.

4. In a refrigerating apparatus, the combination, with a refrigerant supply pipe and suitable cooling pipes or chambers, a valve in said chamber in communication with the refrigerant supply pipe, means for automatically actuating said valve at intervals, whereby the refrigerant receiving chamber is alternately filled from the refrigerant supply pipe and emptied by evaporation and expansion within the cooling pipes or chambers, and an expansion passage interposed between said refrigerant receiving chamber and said cooling pipes or chambers, substantially as described.

5. In a refrigerating apparatus, the combination, with a refrigerant supply pipe and suitable cooling pipes or chambers, of a refrigerant receiving chamber in communication with said cooling pipes or chambers, a valve in said refrigerant receiving chamber in communication with said refrigerant supply pipe, means for automatically actuating said valve at intervals, whereby the refrigerant receiving chamber is alternately filled from the refrigerant supply pipe and emptied by evaporation and expansion within the cooling pipes or chambers, an expansion passage interposed between said receiving chamber and said cooling pipes or chambers, and means for preventing the clogging of the said expansion passage, substantially as described.

6. In a refrigerating apparatus, the combination, with a refrigerant supply pipe and suitable cooling pipes or chambers, of a refrigerant receiving chamber in communication with said cooling pipes or chambers, a valve in said refrigerant receiving chamber in communication with said refrigerant supply pipe, means for automatically actuating said valve at intervals, whereby the refrigerant receiving chamber is alternately filled from the refrigerant supply pipe and emptied by evaporation and expansion within the cooling pipes or chambers, an expansion passage interposed between said receiving chamber and said cooling pipes or chambers, a reaming rod within said expansion passage and means for rotating said reaming rod, substantially as described.

7. In a refrigerating apparatus, the combination, with a refrigerant supply pipe, suitable cooling pipes or chambers, a refrigerant receiving chamber communicating with said cooling pipes or chambers, a valve in said receiving chamber in communication with the refrigerant supply pipe, and a valve stem 17 for actuating said valve, of means for automatically alternately opening and closing said valve at intervals, an expansion passage interposed between said refrigerant receiving chamber and said cooling pipes or chambers, and means operated by the revolution of the valve stem 17 for preventing clogging in said expansion passage, substantially as described.

8. In a refrigerating apparatus, the combination, with a refrigerant supply pipe, suitable cooling pipes or chambers, a refrigerant receiving chamber communicating with said cooling pipes or chambers, a valve in said receiving chamber in communication with the refrigerant supply pipe, and a valve stem 17 for actuating said valve, of means for automatically alternately opening and closing said valve at intervals, an expansion passage interposed between said refrigerant receiving chamber and said cooling pipes or chambers, a reaming rod in said expansion passage, and means for causing said reaming rod to be rotated by the rotation of said valve stem 17, substantially as described.

9. In a refrigerating apparatus, the combination, with a refrigerant supply pipe, suitable cooling pipes or chambers, a refrigerant receiving chamber communicating with said cooling pipes or chambers, a valve in said receiving chamber in communication with the refrigerant supply pipe, and a valve stem 17 for operating said valve, of means for automatically alternately opening and closing said valve at intervals, an expansion passage interposed between the refrigerant receiving chamber and the cooling pipes or chambers, a reaming rod within said passage, and gearing for communicating the motion of the valve stem 17 to the reaming rod, substantially as described.

10. In a refrigerating apparatus, the combination, with a refrigerant supply pipe, suitable cooling pipes or chambers, and a valve 18' interposed between said refrigerant supply pipe and said cooling pipes or chambers, of a valve stem 17 for actuating said valve, a water reservoir 1, a float 7 within said reservoir, means for causing the rise and fall of said float to rotate the stem 17 and so to operate the valve 18', a three-way valve in communication with the reservoir 1, inlet and outlet pipes connected with said valve and a stem 25 for actuating said valve, a crated lever 22 swung from said stem 25 and adapted to swing about the same, a ball 23 within said crated lever, a lever 19 keyed to the valve stem 17 and a slotted rod 19' connecting said lever 19 and said crated lever 22, whereby when the stem 17 is rotated the crated lever is tilted, and means for causing the tilting of said crated lever to operate the said three-way valve, substantially as described.

Signed at the city and county of New York, in the State of New York, this 12th day of January, A. D. 1892.

EDWARD W. HOWELL.

Witnesses:
GEO. E. HORNE,
C. L. DAVIS.